United States Patent
Braun et al.

(10) Patent No.: US 7,317,897 B2
(45) Date of Patent: Jan. 8, 2008

(54) POWER BASED RADIO RESOURCE MANAGEMENT

(75) Inventors: Christian Braun, Malmö (SE); Kari Pajukoski, Oulu (FI); Klas Johansson, Sundbyberg (SE)

(73) Assignee: Nokia Corporation, Espoo (FI)

(*) Notice: Subject to any disclaimer, the term of this patent is extended or adjusted under 35 U.S.C. 154(b) by 276 days.

(21) Appl. No.: 10/515,265

(22) PCT Filed: Jun. 4, 2002

(86) PCT No.: PCT/IB02/01999

§ 371 (c)(1),
(2), (4) Date: Nov. 18, 2004

(87) PCT Pub. No.: WO03/103183

PCT Pub. Date: Dec. 11, 2003

(65) Prior Publication Data

US 2005/0153660 A1 Jul. 14, 2005

(51) Int. Cl.
*H04B 1/00* (2006.01)
*H04B 15/00* (2006.01)

(52) U.S. Cl. .............. 455/63.1; 455/522; 455/524; 455/525

(58) Field of Classification Search ......... 455/63.1, 455/67.11, 67.13, 67.14, 522, 524, 525, 453, 455/405
See application file for complete search history.

(56) References Cited

U.S. PATENT DOCUMENTS

| 5,987,055 A | 11/1999 | Duque-Anton et al. ..... 375/200 |
| 2001/0038356 A1* | 11/2001 | Frank ..................... 343/853 |
| 2003/0218974 A1* | 11/2003 | Zuniga ..................... 370/229 |

FOREIGN PATENT DOCUMENTS

WO    WO 00/55976    9/2000

OTHER PUBLICATIONS

Ronghong Mo et al. "Uplink Capacity Analysis of a Spectrally Overlaid Multi-band CDMA System with Inter- and Intra-cell Interferences" Conference Record of the 2001 IEEE International Conference on Communications, Helsinki, Finland, Jun. 11-14, 2001, NY, NY, vol. 1, Jun. 11, 2001, pp. 3005-3011.

* cited by examiner

*Primary Examiner*—Matthew Anderson
*Assistant Examiner*—Tuan Pham
(74) *Attorney, Agent, or Firm*—Robert M. Bauer; Lackenbach Siegel, LLP

(57) ABSTRACT

A method and apparatus for power-based radio resource management in wireless radio systems based on continuously measuring a total interference power/$_{tot}$ and own-cell interference power/$_{own}$ as well as a continuously estimating the system noise power $P_N$ and/or the other-to-own cell interference ratio i based on these measurements. As a result, improved values $P_N$ and i are provided and a more accurate load factor/noise rise calculation can be performed.

17 Claims, 7 Drawing Sheets

POWER BASED RADIO RESOURCE MANAGEMENT

FIELD OF THE INVENTION

The present invention relates to a method and a device for power based radio resource management in wireless radio systems, such as wireless CDMA systems.

BACKGROUND OF THE INVENTION

In wireless radio systems, such as the third generation (3G) system, radio resource management (RRM) is responsible for utilisation of the air interface resources. RRM is used in order to guarantee the so-called Quality of Service (QoS), to maintain the planned coverage area and to offer high capacity to the users. RRM can be divided into different functionalities, such as hand-over control, power control, admission control, load control and packet scheduling functionalities. These functions are required to guarantee the Quality of Service and to optimise the system data throughput with a mix of different bit rates, services and quality requirements.

RRM algorithms can be based on the amount of hardware in the network or on the interference levels in the air interface. The case where the hardware limits the capacity before the air interface gets overloaded is called "hard blocking". The case where the air interface load is estimated to be above the planned limit is called "soft blocking". It has been shown that soft blocking based RRM is advantageous as it provides higher capacity than hard blocking based RRM. Therefore, the present invention is concerned with soft blocking based RRM.

In case of utilising soft blocking based RRM, the air interface load needs to be measured. The estimation of the uplink load of the air interface can be based on the wideband received power level or on throughput. The present invention is engaged with load estimation based on wideband received power.

The received power levels can be measured in the base station. Based on such measurements, the uplink load factor η can be obtained. The corresponding calculations are explained hereinafter with reference to FIG. 1.

FIG. 1 shows a base station BS including an antenna 1. For simplicity it is assumed here that one BS equals one cell. The concept can however be extended to cover the case where one BS has several cells. The base station BS receives via the antenna 1 an own-cell interference power $I_{own}$ from all intra-cell users connected to the base station BS. Furthermore, the base station receives via the antenna 1 an other-cell interference power $I_{oth}$ from all inter-cell users that are utilizing the same carrier frequency but are connected to other cells than this own cell.

Furthermore, the base station BS receives system noise with a system noise power $P_N$ via the antenna 1 as well as from its own system components, i.e. system noise is at least partly inherent in a base station BS.

The own-cell interference power $I_{own}$, the other-cell interference power $I_{oth}$, and the system noise power $P_N$ represent the received wideband interference power, called total received power. This can be expressed by the following equation:

$$I_{tot} = I_{own} + I_{oth} + P_N$$

The total received power is measured continuously by means of a measurement circuit 3A. The system noise power $P_N$ can be measured by the base station by means of a measurement circuit 2. The system noise power $P_N$ is commonly estimated at night, when the load is assumed to be small. Thus, the own-cell interference power $I_{own}$ and the other-cell interference power $I_{oth}$ are small as well. This results in $$P_N \approx I_{tot}$$

The thus estimated noise power $P_N$ is then used in an RRM controller 3 to perform RRM functionalities, such as load control and admission control.

Unfortunately, this method cannot cope with system noise differences between day and night. Furthermore, this prior art method does not allow to determine the other-to-own cell interference ratio i at all, namely the ratio of the other-all interference power $I_{oth}$ to the own-all interference power $I_{own}$. Thus, rather conservative noise rise targets have to be used in load control. This degrades system-performance.

SUMMARY OF THE INVENTION

It is therefore an object of the present invention to improve the radio resource management.

This object is achieved by a method for power based radio resource management in wireless radio systems comprising the steps of
 continuously measuring a total interference power $I_{tot}$ received at a base station,
 continuously measuring an own-cell interference power $I_{own}$ of all intra-cell users connected to a predetermined cell, received at said base station,
 continuously estimating a system noise power $P_N$ and/or continuously estimating an other-to-own cell interference ratio i based on a number of consecutive measurements of said total interference power $I_{tot}$ obtained by said total interference power $I_{tot}$ measuring step and based on a number of consecutive measurements of said own-cell interference power $I_{own}$ obtained by said own-cell interference power $I_{own}$ measuring step, and
 performing at least one functionality of said radio resource management based on said estimation of said system noise power $P_N$ and/or said other-to-own cell interference ratio i.

Furthermore, the above object is achieved by a device for power based radio resource management in wireless radio systems comprising:
 means for continuously measuring a total interference power $I_{tot}$ received at a base station,
 means for continuously measuring an own-cell interference power $I_{own}$ of all intra-cell users connected to a predetermined cell, received at said base station,
 means for continuously estimating a system noise power $P_N$ and/or continuously estimating an other-to-own cell interference ratio i based on a number of consecutive measurements of said total interference power $I_{tot}$ obtained by said total interference power $I_{tot}$ measuring means and based on a number of consecutive measurements of said own-cell interference power $I_{own}$ obtained by said own-cell interference power $I_{own}$ measuring means, and
 means for performing at least one functionality of said radio resource management based on said estimation of said system noise power $P_N$ and/or said other-to-own cell interference ration i.

The present invention improves the performance of RRM systems, in particular RRM functionalities such as admission control and load control. In power based radio resource management there are two important system parameters related to the uplink (reverse link), namely the other-to-own cell interference ratio i and the system noise power $P_N$. Knowledge of these parameters is advantageous for certain RRM functionalities such as load control and admission control. These parameters are very useful for radio network planning and optimisation purposes. The present invention enables an online estimation of the other-to-own cell interference ratio i and the system noise power $P_N$. In particular, as the other-to-own cell interference ratio i and the system noise power $P_N$ are time varying a robust online estimation of these parameters is desirable. Online knowledge of these parameters is useful for e.g. load estimation and identification of cells with interference problems, e.g. a high other-to-own cell interference ratio i.

Due to more exact estimates of system noise power $P_N$, less conservative noise rise targets can be used in load control, which in turn means that a higher capacity can be reached for that particular cell.

The present invention further provides new possibilities to network planning and optimisation, since the interference situation in each cell can be monitored online. Cells with potential problems are easily detected and trouble-shooting becomes easier.

When using power based load control, accurate knowledge of system noise power $P_N$ is desirable. Therefore, preferably, the uplink load factor $\eta$ is continuously calculated as $$\eta = 1 - \frac{P_N}{I_{tot}}$$

wherein $I_{tot}$ is said estimated total interference power and $P_N$ is said estimated system noise power.

Alternatively the uplink noise rise NR is continuously calculated as $$NR = \frac{I_{tot}}{P_N}$$

or as $$NR = \frac{1}{1 - \eta}.$$

The system noise power $P_N$ varies over time. For example, man made noise, e.g. from engines etc., is added to the system noise and can be considerably higher at rush hours than at night. Therefore, preferably, the system noise is estimated online, continuously, in order to allow a more accurate load factor/noise rise calculation. In particular the noise rise NR calculation shows that an accurate system noise power $P_N$ estimation is advantageous as an error in the system noise power $P_N$ yields an error in noise rise NR.

Further advantageous developments are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
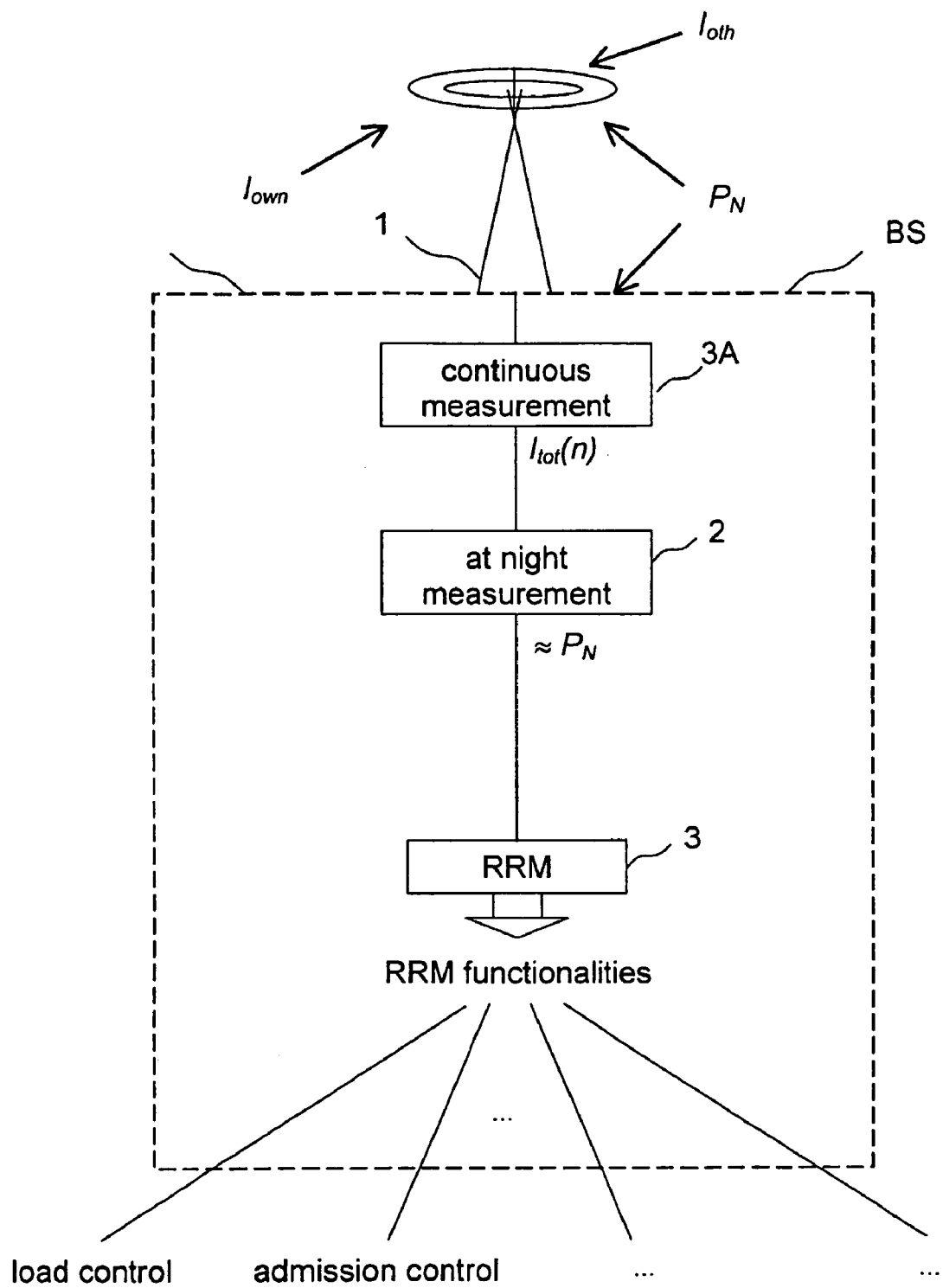
FIG. 1 shows a base station with a power based radio resource management system according to the prior art.

FIG. 1 has been explained with reference to the prior art in order to explain the background of the invention. Therefore, the above explanations with regard to FIG. 1 apply to the invention as well, as far as nothing else is described hereinafter.

Figure 2:
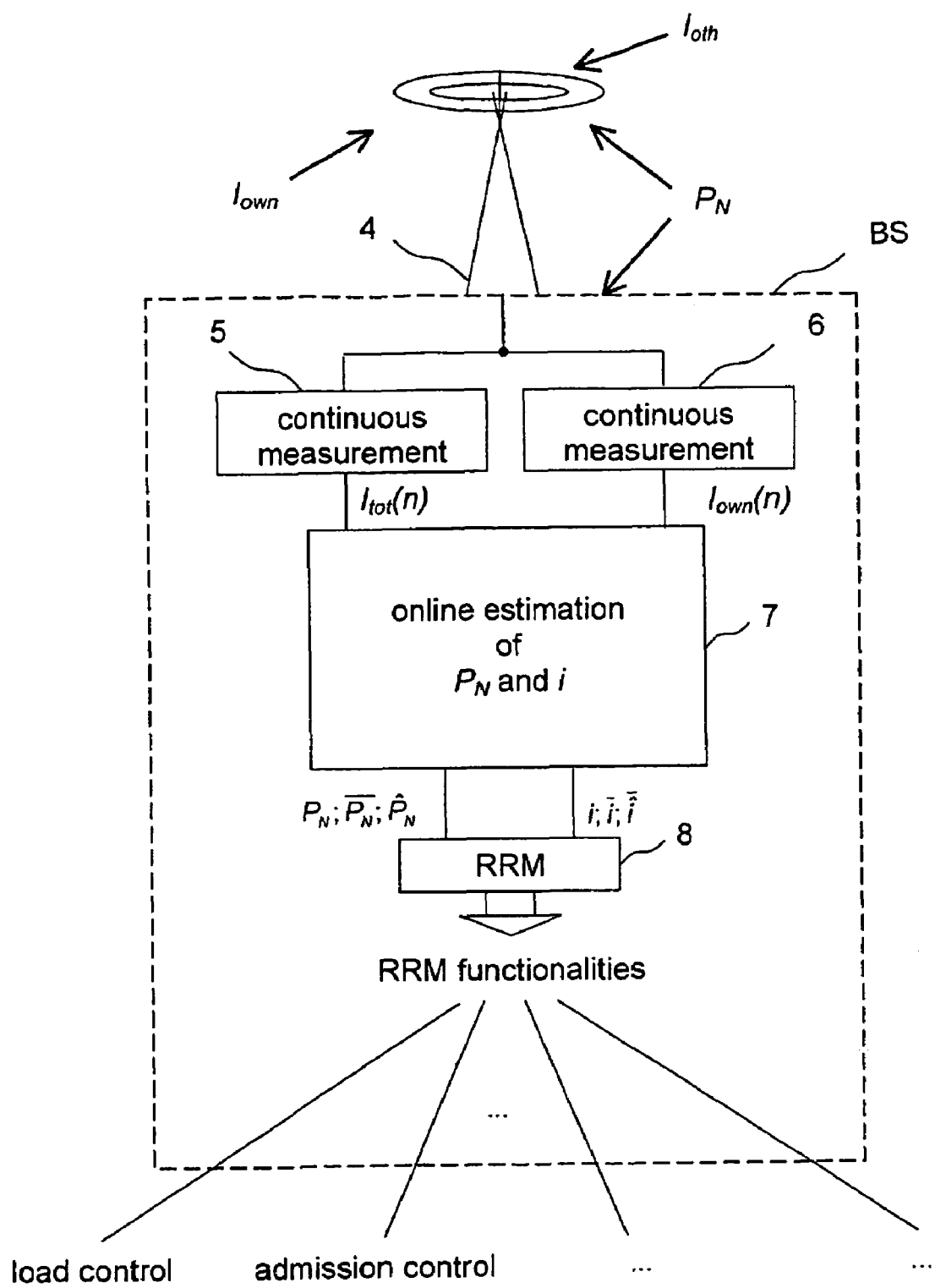
FIG. 2 shows a base station with a power based radio resource management system according to an embodiment of the present invention comprising online estimation of system noise power $P_N$ and other-to-own cell interference ratio i.

FIG. 2 shows a schematic diagram of a base station BS including an antenna 4 for communication between a radio network, such as a UMTS network utilizing wireless CDMA, and user equipment (not shown), e.g. mobile phones or any other mobile devices.

Such a base station BS covers a certain area in order to establish a wireless connection between the base station BS and the user equipment(s) being located within this area. Such an area is defined as a cell.

However, practically, there can be user equipment within a certain cell that is connected with the base station of another cell. Such user equipment causes interference with the signals that are intended for this specific base station BS. Furthermore, user equipment may interfere with this specific base station even though they are not located within the cell of this specific base station BS. These interferences can be regarded as other-cell interference for all inter-cell user equipments that are connected to other cells as far as they are utilizing the same carrier frequency as this specific base station BS. The power of this other-cell interference is defined as other-cell interference power $I_{oth}$.

It is noted that $I_{own}$ and $I_{oth}$ refer only to interference sources within the same frequency band as the base station BS in question. Interference from sources in other frequency bands may arise due to non-perfect filters. For example, UEs operating on another frequency band may have non-negligible adjacent channel leakage into the frequency band of interest, thus causing interference. This interference is covered in the system noise term, $P_N$, and is one of the reasons for the time-varying nature of $P_N$.

Furthermore, all the user equipments connected to this certain cell (hereinafter referred as own-cell) cause an own-cell interference. The own-cell interference power that is received at the base station of this own-cell (the power that is caused by all intra-cell users connected to the own-cell) is defined as $I_{own}$. Note that the own cell interference is actually the useful part of the received power, carrying the transmitted user data from the user equipments (UEs).

Furthermore, the base station BS receives background noise, in particular via the antenna 4, and a noise caused by the receiver section of the base station BS, namely the receiver noise. This background noise and the receiver noise as well as any other noise that by occur in such a radio system is defined as system noise with a system noise power $P_N$.

The sum of the other-cell interference power $I_{oth}$, the own-cell interference power $I_{own}$ as well as the system noise power $P_N$ is hereinafter referred as the total uplink interference power $I_{tot}$.

The total uplink interference power $I_{tot}$ varies over time and is seen by the base station BS at every time instant n as:

$$I_{tot}(n)=I_{own}(n)+I_{oth}(n)+P_N(n)$$

This total interference power $I_{tot}(n)$ is continuously measured by a continuous total interference power $I_{tot}$ measurement circuit that is comprised in the base station BS.

Furthermore, the base station BS comprises a continuous own-cell interference power $I_{own}$ (n) measurement circuit 6 for continuously measuring the own-cell interference power $I_{own}$ (n).

Both measurement circuits 5, 6 continuously provide consecutive measured values $I_{tot}$ (n) and $I_{own}$ (n), e.g. every 100 ms. The provided value should reflect the average value over the measurement period. Thus, n can be seen as every measurement reporting instance of the base station BS.

The values of $I_{tot}$ (n) and $I_{own}$ (n) are provided to online estimation means 7 that are implemented by software and/or hardware, e.g. by an online estimation circuit. The online estimation means estimates based on the received values $I_{tot}$ (n) and $I_{own}$ (n) the system noise power $P_N$ as well as an other-to-cell interference ratio i that is defined as:

$$i(n) = \frac{I_{oth}(n)}{I_{own}(n)}$$

Thus, the total interference power $I_{tot}$ can be written as $$I_{tot}(n)=I_{own}(n)+i(n)\cdot I_{own}(n)+P_N=I_{own}(n)\cdot(1+i(n))+P_N(n)$$

Figure 3:
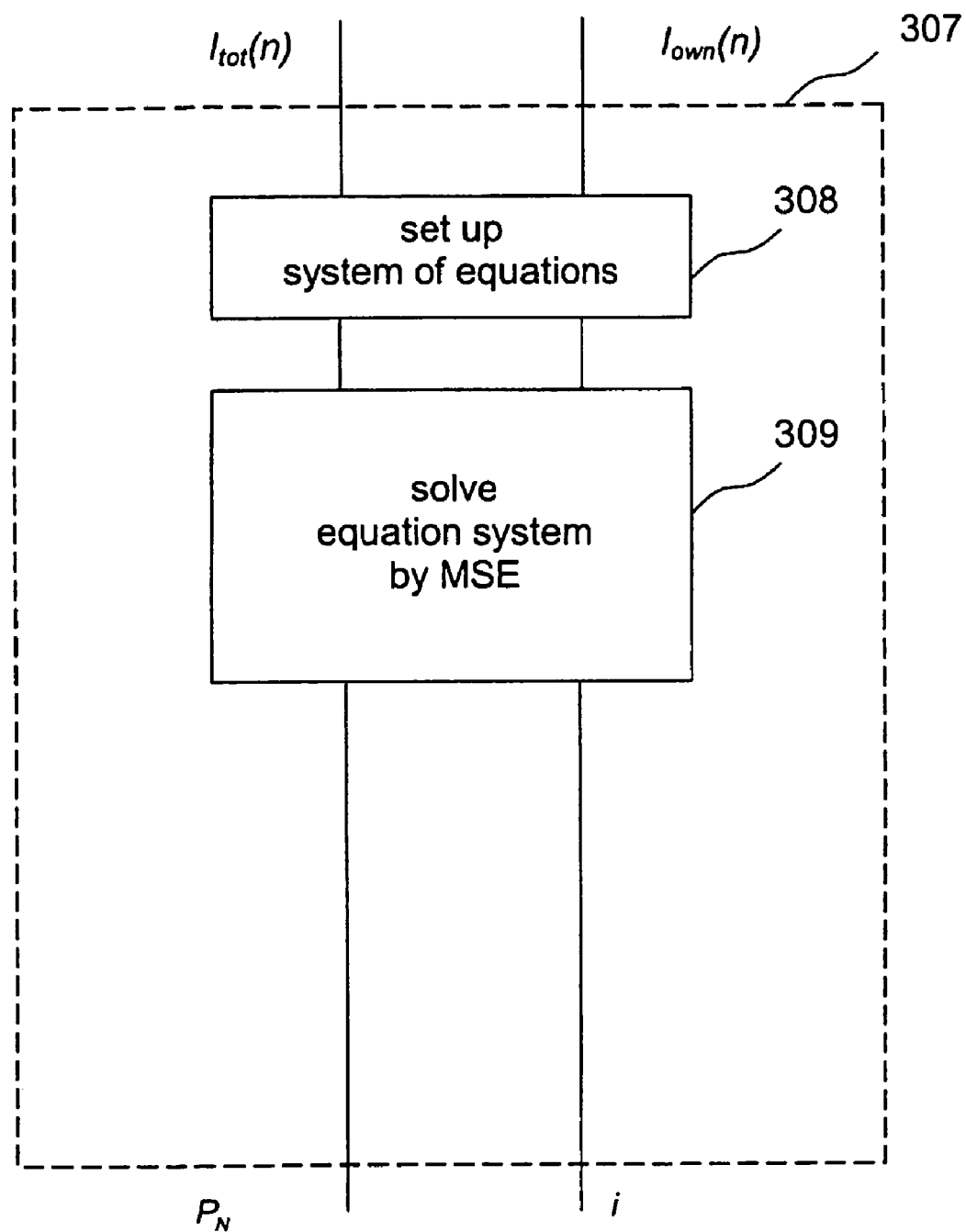
FIG. 3 shows a first embodiment of the online estimation of the system noise power $P_N$ and the other-to-own cell interference ratio i shown in FIG. 2.

The online estimation means 7 assumes that the total interference power $I_{tot}$ and the own-cell interference power $I_{own}$ are continuously measured by the base station BS, in particular by the measurements circuits 5, 6 and utilizes these measurements to estimate the other-to-own cell interference ratio i and the system noise power $P_N$. FIG. 3 illustrates the online estimation circuit 7 of FIG. 2 which is denoted as 307 in FIG. 3. A number of consecutive measurements of the total interference power $I_{tot}$ and the own-cell interference power $I_{own}$ is carried out. Thus a system of equations is set up according to:

$$\begin{bmatrix} I_{tot}(n) \\ I_{tot}(n+1) \\ \vdots \\ I_{tot}(n+N) \end{bmatrix} = \begin{bmatrix} I_{own}(n)\cdot(1+i)+P_N \\ I_{own}(n+1)\cdot(1+i)+P_N \\ \vdots \\ I_{own}(n+N)\cdot(1+i)+P_N \end{bmatrix}$$

$$= \begin{bmatrix} I_{own}(n) & 1 \\ I_{own}(n+1) & 1 \\ \vdots & \vdots \\ I_{own}(n+N) & 1 \end{bmatrix} \cdot \begin{bmatrix} (1+i) \\ P_N \end{bmatrix}$$

This set up of a system of equations is performed by set up system of equation means 308, e.g. by software implementation or by hardware implementation, e.g. by a corresponding circuit.

According to a first embodiment of the online estimation means 7, namely as shown in FIG. 3 as online estimation circuit 307, it is assumed that the other-to-own cell interference ratio i and the system noise power $P_N$ are fairly constant over the sequence N (independent of n). Thus, the equation system can be solved by means of minimum mean square error method (MSE) that is implemented in equation system solving means 309, either by hardware or by software implementation. Thus, estimates of the other-to-own cell interference ratio i and the system noise power $P_N$ are found.

Referring back to FIG. 2 these estimates of the other-to-own cell interference ratio i and the system noise power $P_N$ are provided to a radio resource management unit 8 that in turn is realized by hardware and/or software implementation. This radio resource management unit 8 performs the functionalities of the radio resource management based on the received estimates of the received system noise power $P_N$ and the other-to-own cell interference ratio i. These functionalities are e.g. load control, admission control, packet scheduling, power control, handover control, load estimation and/or identification of cells with interference problems.

Figure 4:
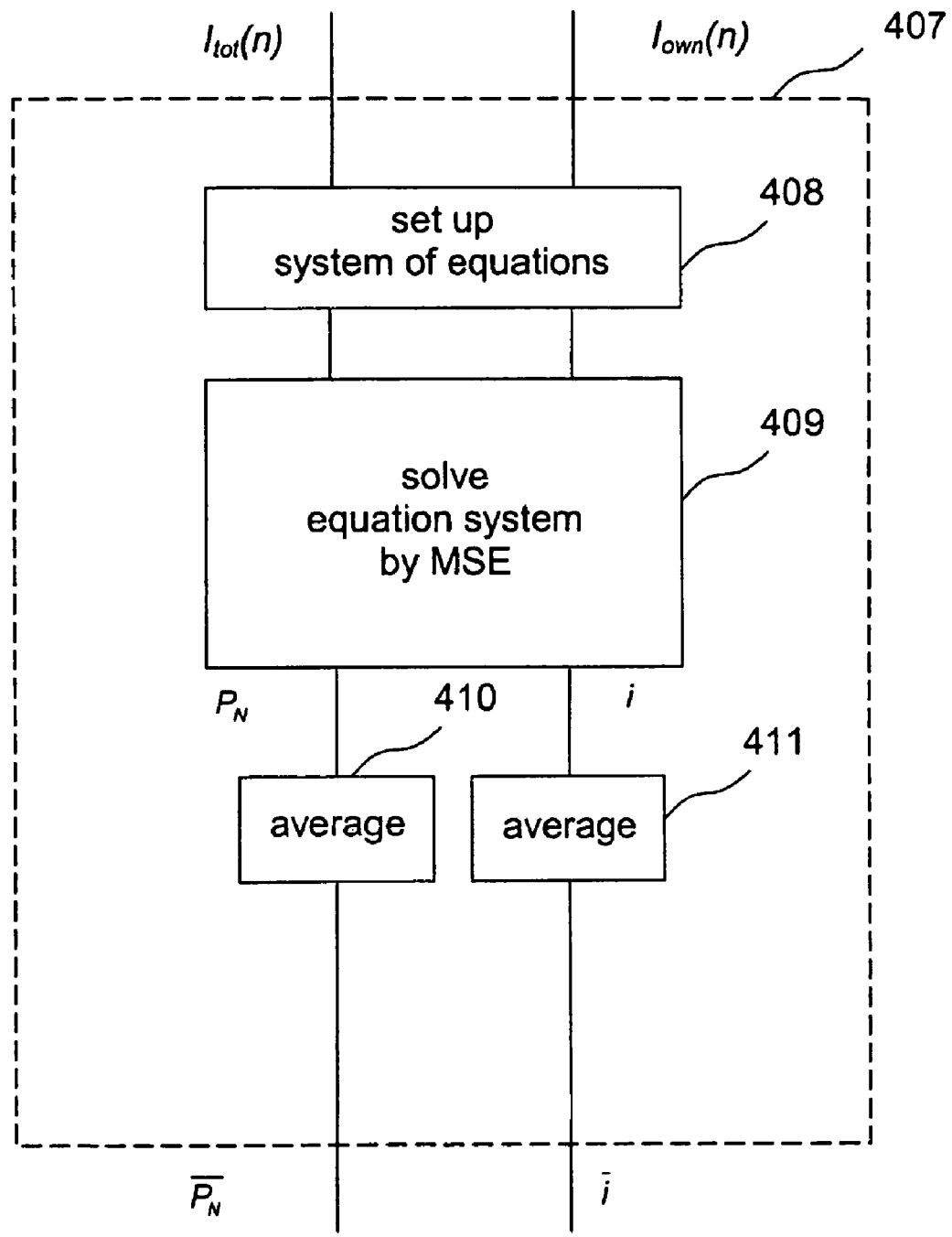
FIG. 4 shows a second embodiment of the online estimation of the system noise power $P_N$ and the other-to-own cell interference ratio i shown in FIG. 2.

FIG. 4 shows a further embodiment of the online estimation means 7 shown in FIG. 2 being denoted with 407 in FIG. 4. Online estimation means 407 corresponds mainly to online estimation means 307 and thus comprises set up system of equation means 408 and equation system solving means 409. However, the estimates of the system noise power $P_N$ and the other-to-own cell interference ratio i are averaged over time in order to get more stable results. Therefore, respective average means 410 for the system noise power estimate $P_N$ are provided in order to yield an averaged system noise power value $\overline{P_N}$ and average means 411 for the other-to-own cell interference ratio i estimate are provided in order to yield an averaged other-to-own cell interference ratio value $\overline{i}$.

Figure 5:
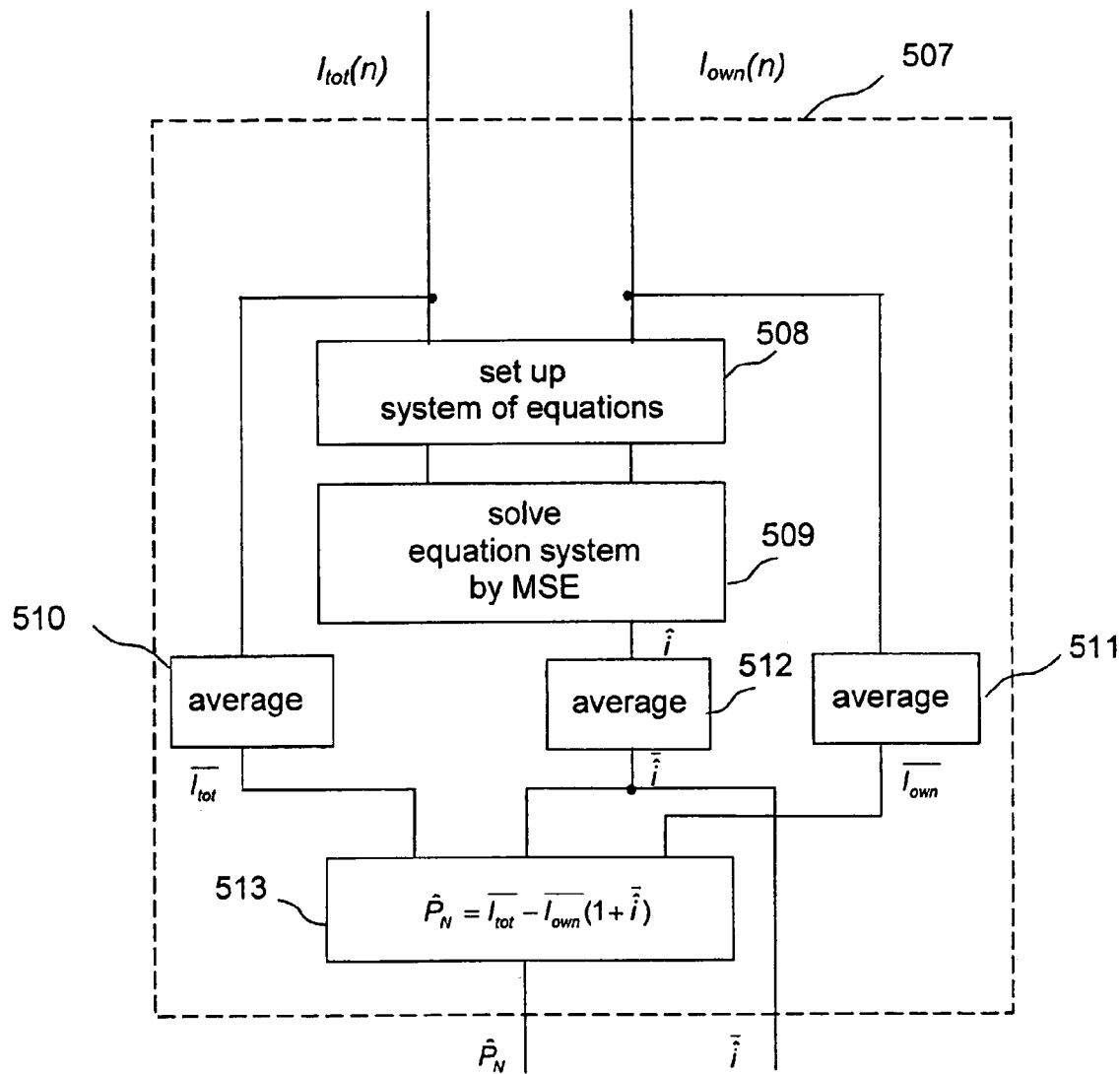
FIG. 5 shows a third embodiment of the online estimation of the system noise power $P_N$ and the other-to-own cell interference ratio i shown in FIG. 2.

FIG. 5 shows a further embodiment of the online estimation means 7 of FIG. 2 being denoted as online estimation means 507 in FIG. 5. Online estimation means 507 is designed in order to provide even better estimates of the signal noise power $P_N$ by using averaged values of the received powers $I_{tot}$ (n) and $I_{own}$ (n) over a predetermined period of time, e.g. 10 s. Further, a corresponding average value of the estimated other-to-own cell interference ratio i is provided as well. In order to achieve this aim, online estimation circuit 507 comprises not only set up system of equation means 508 and equation system solving means 509 which correspond to means 308, 408 and 309, 409 respectively, but also comprises average means 510 for the continuously measured total interference power values $I_{tot}$ (n) and own-cell interference power $I_{own}$ (n) provided by the measurement circuits 5, 6, respectively. Hence, averaged values for the total interference power and the own-cell interference power are provided as $\overline{I_{tot}}$ and $\overline{I_{own}}$.

The measured values $I_{tot}(n)$ and $I_{own}(n)$ are provided to set up system of equation means 508 which in turn provides its results to equation system solving means 509. Equation system solving means 509 calculates the other-to-own cell interference ratio namely $\hat{i}$ as described above.

The estimated value for the other-to-own cell interference ratio $\hat{i}$ is averaged by average means 512 in order to generate an averaged estimated value $\overline{\hat{i}}$ for the other-to-own cell interference ratio.

Based on this averaged estimated other-to-own cell interference ratio $\overline{\hat{i}}$ and the averaged received powers $\overline{I_{tot}}$ and $\overline{I_{own}}$ an improved estimate for the system noise power $\hat{P}_N$ can be calculated by calculation means 513 as:

$$\hat{P}_N = \overline{I_{tot}} - \overline{I_{own}}(1+\tilde{i})$$

wherein $\overline{I_{tot}}$ is the average $I_{tot}$, $\overline{I_{own}}$ is the average $I_{own}$ and $\tilde{i}$ is the average estimated i over the same time period. The reason why this estimate becomes better is that the error in the estimated i is scaled down, since $\overline{I_{own}}$ is always smaller than $\overline{I_{tot}}$. Moreover, the fast fluctuating nature of i is averaged out, which gives a more stable performance.

As a result better estimates $\hat{P}_N$ and $\tilde{i}$ are achieved for the system noise power and the other-to-own cell interference ratio i based on the averaged values $\overline{I_{tot}}$ and $\overline{I_{own}}$ as well as $\tilde{i}$.

All the above mentioned means comprised in the base station BS and in particular the online estimation means 7, 307, 407 and 507 can be implemented by means of hardware and/or software. In particular, as the above described estimation is not very demanding in terms of computing power and real-time requirements it can be easily implemented in software even though hardware implementation is possible as well.

The performance of the estimation is dependent on the number of measurement samples N used in the minimum mean square error estimation. Even though N may be set arbitrarily, a reasonable value is in the range between 5 and 10.

Figure 6:
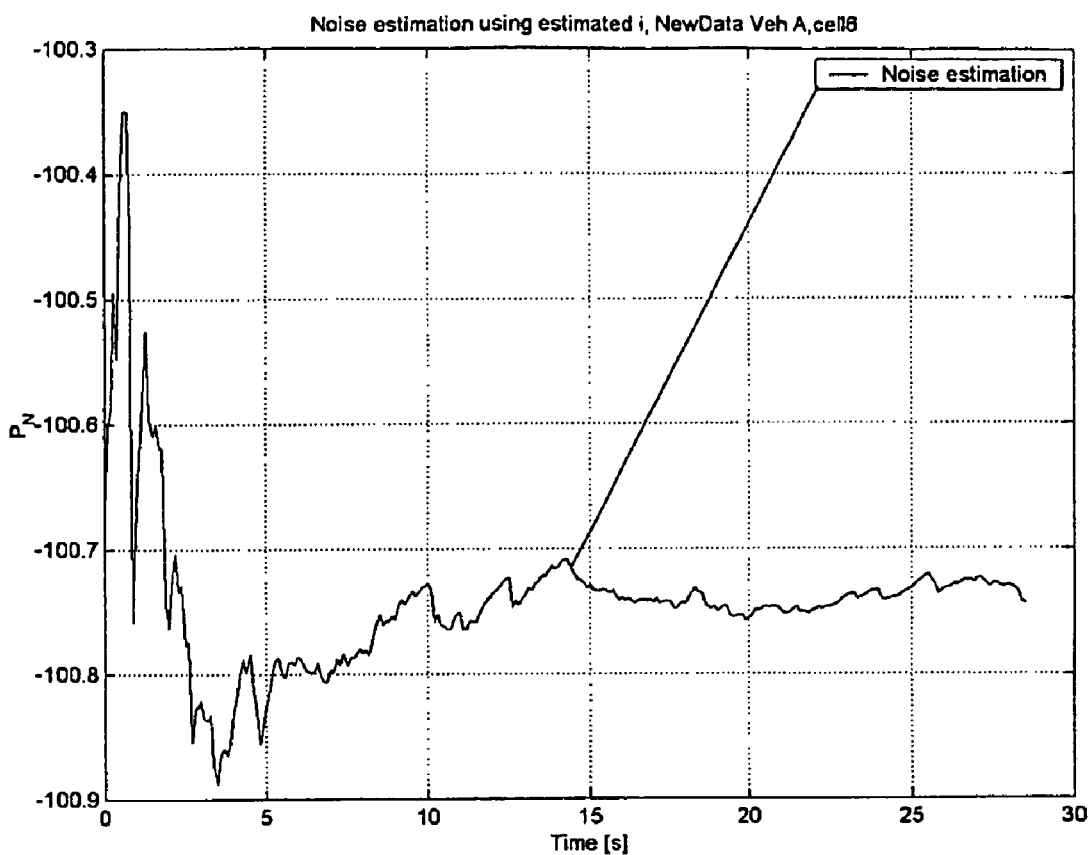
FIG. 6 shows a chart illustrating the performance of the system noise power $P_N$ estimation.
Figure 7:
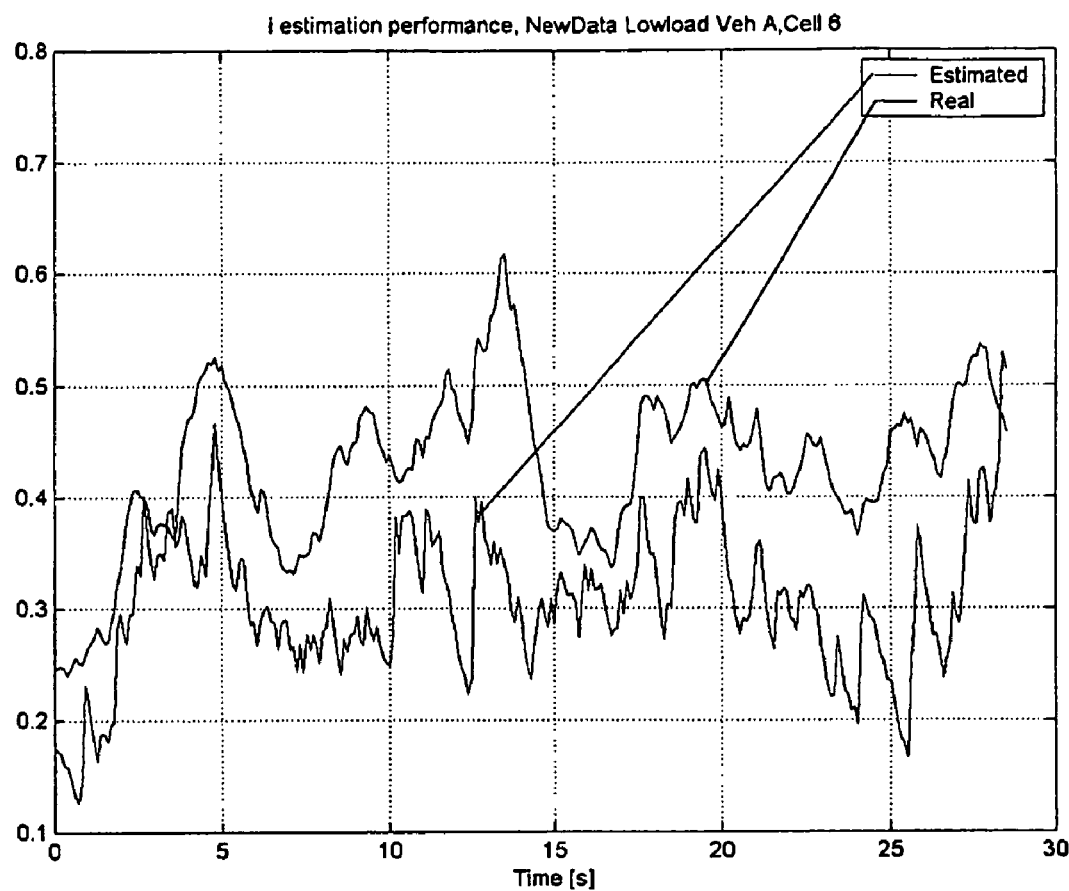
FIG. 7 shows a chart illustrating the performance of the other-to-own cell interference ratio i.

The performance of the above described system noise power and other-to-own cell interference ratio i estimations have been tested using simulated data from a dynamic WCDMA network simulator. The results are shown in FIGS. 6 and 7. Even though the other-to-own cell interference ratio is slightly underestimated, the system noise power estimation is close to the true level.

FIG. 6 shows the performance of the system noise power estimation $P_N$. Each value plotted is derived using the average of all previous power measurements. The system noise power estimation converges to about −100.74 dBm, while the true system noise power was −100.9 dBm (constant), i.e. the noise power was overestimated by 0.16 dB. The uplink average noise rise in this simulation was 2.3 dB. N=10 consecutive measurements were used for every new estimate of the other-to-own cell interference ratio i.

FIG. 7 shows the other-to-own cell interference ratio i estimation. N=10 consecutive measurements were used for every new estimation of the other-to-own cell interference ratio and the result is filtered with an IIR filter with forgetting factor alpha=0.1. The average estimated other-to-own cell interference ratio i was 0.32 whereas the true value was 0.43.

It is noted that the present invention is not restricted to the preferred embodiments described above. In particular, the above described estimations can be performed in the radio network controller (the equipment in e.g. a radio network subsystem for controlling the use and the integrity of the radio resources) as well. Thus the estimation have not necessarily to be performed in the base station. Both, the base station as well as the radio network controller comprise a radio resource management functional part which is suitable to implement the above described estimations. Thus, the preferred embodiments may vary within the scope of the attached claims.

The invention claimed is:

1. A method for power based radio resource management in wireless radio systems comprising the steps of:

continuously measuring a total interference power ($I_{tot}$) received at a base station (BS), continuously measuring an own-cell interference power ($I_{own}$) of all intra-cell users connected to a predetermined cell, received at said base station (BS), continuously estimating a system noise power ($P_N$) and continuously estimating an other-to-own cell interference ratio (i) based on a number of consecutive measurements of said total interference power ($I_{tot}$) obtained by said total interference power ($I_{tot}$) measuring step and based on a number of consecutive measurements of said own-cell interference power ($I_{own}$) obtained by said own-cell interference power ($I_{own}$) measuring step, and performing at least one functionality of said radio resource management based on said estimation of said system noise power ($P_N$) and said other-to-own cell interference ratio (i).

2. A method according to claim 1, wherein said functionality comprises load control, admission control, packet scheduling, power control, handover control, load estimation, and/or identification of cells with interference problems.

3. A method according to claim 1, wherein said system noise power ($P_N$) being received at said base station (BS) as well as being inherent in said base station (BS).

4. A method according to claim 1, wherein said other-to-own cell interference ratio (i) is defined as the ratio of an other-cell interference power ($I_{oth}$) of all inter-cell users connected to other cells than said predetermined cell utilizing the same carrier frequency as said predetermined cell to said own-cell interference power ($I_{own}$).

5. A method according to claim 1, wherein an uplink load factor η is continuously calculated as $$\eta = 1 - \frac{P_N}{I_{tot}}$$

wherein $I_{tot}$ is said estimated total interference power and $P_N$ is said estimated system noise power.

6. A method according to claim 1, wherein an uplink noise rise NR is continuously calculated as $$NR = \frac{I_{tot}}{P_N}$$

or as $$NR = \frac{1}{1-\eta}$$

wherein $I_{tot}$ is said estimated total interference power, $P_N$ is said estimated system noise power and η is said uplink load factor.

7. A method according to claim 1, wherein said estimating step uses a sequence of N+1 consecutive measurements and comprises the step of setting up a system of equations according to:

$$\begin{bmatrix} I_{tot}(n) \\ I_{tot}(n+1) \\ \vdots \\ I_{tot}(n+N) \end{bmatrix} = \begin{bmatrix} I_{own}(n) \cdot (1+i) + P_N \\ I_{own}(n+1) \cdot (1+i) + P_N \\ \vdots \\ I_{own}(n+N) \cdot (1+i) + P_N \end{bmatrix}$$

$$= \begin{bmatrix} I_{own}(n) & 1 \\ I_{own}(n+1) & 1 \\ \vdots & \vdots \\ I_{own}(n+N) & 1 \end{bmatrix} \cdot \begin{bmatrix} (1+i) \\ P_N \end{bmatrix}$$

wherein n is a measurement reporting instance and N is an integer value.

8. A method according to claim 7, wherein said estimating step further comprises the step of solving the system of equations by using the minimum mean square error method.

9. A method according to claim 7, wherein N is an integer value in the range of 5 to 10.

10. A method according to claim 1, wherein said estimated system noise power ($P_N$) and said estimated other-to-own cell interference ratio (i) are averaged over time, respectively.

11. A method according to claim 1, wherein a system noise power ($P_N$) estimate is calculated as $\hat{P}_N = \overline{I_{tot}} - \overline{I_{own}}(1+\bar{i})$ wherein $\overline{I_{tot}}$ is an average value of the total interference power ($I_{tot}$), wherein $\overline{I_{own}}$ is an average value of the own-cell interference power ($I_{own}$), and wherein $\bar{i}$ is an average value of the estimated other-to-own cell interference ratio (i).

12. A method according to claim 11, wherein all average values are calculated over the same time period.

13. A method according to claim 1, wherein said method being implemented in a radio resource management functional part of said base station (BS).

14. A method according to claim 1, wherein said method being implemented in a radio resource management functional part of a radio network controller.

15. A method according to claim 1, wherein said wireless radio system being a code division multiple access (CDMA) system.

16. A device for power based radio resource management (RRM) in wireless radio systems comprising:
means for continuously measuring a total interference power ($I_{tot}$) received at a base station (BS),
means for continuously measuring an own-cell interference power ($I_{own}$) of all intra-cell users connected to a predetermined cell, received at said base station (BS),
means for continuously estimating a system noise power ($P_N$) and continuously estimating an other-to-own cell interference ratio (i) based on a number of consecutive measurements of said total interference power ($I_{tot}$) obtained by said total interference power ($I_{tot}$) measuring means and based on a number of consecutive measurements of said own-cell interference power ($I_{own}$) obtained by said own-cell interference power ($I_{own}$) measuring means, and
means for performing at least one functionality of said radio resource management (RRM) based on said estimation of said system noise power ($P_N$) and said other-to-own cell interference ratio (i).

17. A device according to claim 16, wherein said device further comprises means for performing a method according to claim 2.

* * * * *